United States Patent Office 3,772,221
Patented Nov. 13, 1973

3,772,221
PREPARATION OF POLYURETHANE FOAMS AND MICROCELLULAR ELASTOMERS WITH INTEGRAL SKINS USING A COMBINATION OF TETRAALKYLGUANIDINE AND AN ORGANOMERCURY COMPOUND
Fritz Hostettler, Freehold, N.J., and George W. Huffman, Crystal Lake, and Norman E. Rustad, Barrington, Ill., assignors to The Quaker Oats Company, Chicago, Ill.
No Drawing. Filed Jan. 12, 1972, Ser. No. 217,273
Int. Cl. C08g 22/44
U.S. Cl. 260—2.5 AZ
6 Claims

ABSTRACT OF THE DISCLOSURE

This invention relates to a method for preparing polyurethane foams and microcellular elastomers with integral skins which are substantially non-porous, said method comprising contacting a mixture of specified polyols with a specified quasi-prepolymer of toluene diisocyanate in the presence of a blowing agent and a catalyst system consisting of a tetraalkylguanidine and an organomercury compound.

BACKGROUND OF THE INVENTION

Field of the invention

This invention concerns a novel process for the preparation of certain polyurethane foams and microcelluar elastomers with integral skins.

Description of the prior art

One of the most significant contributions to the growth of polyurethane technology in recent years is the development of polyurethane foams and microcellular elastomers with integral skins. Integral skin foams and microcellular elastomers, when molded, form their own tough skin which takes on the exact pattern of the mold. This eliminates the separate process of encapsulating the foam or microcellular elastomer in a skin after its formation. A considerable savings in labor cost is thus realized.

Various methods have been proposed to fabricate polyurethane foams and microcellular elastomers with integral skins. U.S. Pat. No. 3,527,852 discloses one such method. The latter scheme relies on rotating the mold to produce the integral skin. It is apparent that it would be highly desirable to provide a method of manufacturing polyurethane foams and microcellular elastomers with integral skins which does not require the rotation, rocking, agitation, etc. of the mold.

Polyurethane foams and microcellular elastomers with integral skins have been made with chlorinated aromatic diamines, modified diphenylmethane diioscyanate or quasiprepolymers of toluene diisocyanate to obtain the necessary skin properties to resist abuse. These systems based on aromatic diamines are highly reactive, yielding very short handling times and are also expensive. Often these foams or microcellular elastomers tend to discolor top protective coatings. Consequently, many searchers have looked for systems which contain no chlorinated aromatic diamine but produce a foam or microcellular elastomer having a tough skin which is substantially non-porous.

SUMMARY OF THE INVENTION

It is an object of this invention to provide an improved and simple method for preparing certain polyurethane foams and microcellular elastomers with integral skins wherein the mold is not rocked.

Another object of this invention is to provide a method of manufacturing certain polyurethane foams and microcellular elastomers with integral skins which eliminates the use of chlorinated aromatic diamines.

Still another object of this invention is to provide a process whereby the product foam or microcellular elastomer has an integral skin which is substantially non-porous and has good tear strength.

Yet another object of this invention is to provide a process whereby large molded articles can be demolded within about 10 minutes.

The objects of this invention are accomplished by a method for preparing polyurethane foams and microcellular elastomers with integral skins which comprises the sequential steps of (a) Contacting under substantially anhydrous conditions (1) an ethylene oxide capped propylene oxide adduct of a first triol, said ethylene oxide capped adduct having 40 to 75 percent primary hydroxyl and an average molecular weight of about 2000 to about 7000;
(2) polytetramethylene ether glycol having an average molecular weight of 500 to 1000;
(3) a diol;
(4) a second triol or a quadrol simultaneously with a quasi-prepolymer of toluene diisocyanate and a third triol; in the presence of a catalyst system consisting of a tetraalkylguanidine or an isocyanate adduct thereof and an organomercury compound; and in the presence of a blowing agent which vaporizes under the contacting conditions;

(b) Pouring the contacted mixture into a mold which is preheated to a temperature between about 30° C. and 55° C.;

(c) Permitting the contents of the mold to cure in contact with the mold; and (d) Removing the resulting self-supporting polyurethane product from the mold.

The term ethylene oxide capped propylene oxide adduct of a triol is to be understood to mean that propylene oxide has been permitted to react with a triol to form an adduct and subsequently ethylene oxide has been permitted to react with the adduct to produce a product having 40 to 75 percent primary hydroxyl and an average molecular weight betwen 2000 and 7000. Suitable triols include aliphatic triols having a molecular weight less than 500 such as trimethylol propane; glycerol; 1,2,4-butanetriol; and 1,2,6-hexanetriol. Ethylene oxide capped propylene oxide adducts are commercially available and are sold under the following trademarks: "Voranol CP 4701" by Dow Chemical Company, Midland, Mich.; "Thanol SF 6500," "Thanol SF 6501," "Thanol TE 4501," and "Thanol TE 3500" by Jefferson Chemical Company, Inc., Houston, Tex.; and "Pluracol TPE 4542" by Wyandotte Chemical Corporation, Wyandotte, Mich. If much less than 40 percent primary hydroxyl is present our process cannot be practiced to produce a polyurethane foam or microcellular elastomer having an integral skin which is substantially non-porous. An ethylene oxide capped polypropylene oxide adduct having much more than 75 percent primary hydroxyl is not readily available.

The polytetramethylene ether glycol used in our process has an average molecular weight between 500 and 1000. Polytetramethylene ether glycols having an average molecular weight of 1000 and 2000 have been tried, but they cause closed cells to form. The formation of open cells in integral skin foams is critical. A large number of closed cells in the foam will cause collapse of the foamed casting. The reason for this is that as the newly formed casting cools, the trapped blowing agent condenses and a vacuum forms causing the flexible cells to shrink. With open cells there is a free flow of gases and, thus, no vacuums are created. The amount of polytetramethylene ether glycol used in our process should be about 5 to 15 percent by weight based on the weight of the total reactants. Throughout this application the weight of the total reactants is the weight of the total formulation minus the weight of the blowing agent and catalysts.

The diol by way of example may be an aliphatic glycol having a molecular weight below 500 such as ethylene glycol, diethylene glycol, and 1,4-butanediol.

The particular diol or combination of diols chosen depends upon the properties desired in the product. The effect of the diol selection is more particularly set forth in the following examples. In general about 2 to 10 percent by weight based on the weight of the total reactants should be diol.

In addition to the diol described above in order to obtain the crosslinking necessary to entrap the blowing agent and to provide a high quality foam or microcellular elastomer, it is necessary to include some crosslinking agents. To provide a good compression set (less than 30%) and a good tear split (about 5 p.l.i.) we have found it necessary to use a combination of a crosslinking triol or quadrol and a quasi-prepolymer of toluene diisocyanate and a triol. Suitable triols useful in the quasi-prepolymer and for the crosslinking triol include those aforementioned. Other suitable crosslinking triols and quadrols include pentaerythritol and triethanolamine. The quasi-prepolymer of toluene diisocyanate and the triol is prepared by conventional procedures from 2,4-toluene diisocyanate; 2,6-toluene diisocyanate; or mixtures thereof and the specified triols and has an NCO content of about 20 to 40 percent.

It is particularly important to our process that the necessary crosslinking be provided by a combination of crosslinking triols or quadrols and a quasi-prepolymer of toluene diisocyanate and a triol. The amount of crosslinking triol or quadrol should be 0.5 to 5 percent based on the weight of the total reactants. The amount of quasi-prepolymer should be approximately the theoretical amount necessary to react with the total polyols (ethylene oxide capped propylene oxide adduct, polytetramethylene ether glycol, diol, and crosslinking triol). We have found that as little as 90 percent and as much as 110 percent of the theoretical amount of quasi-prepolymer is satisfactory.

In general we have found that the diol, polytetramethylene ether glycol, crosslinking triol or quadrol, and ethylene oxide capped propylene oxide adduct should be in an equivalent ratio of about 2:1:1:1 to 5:1:1:1.

The selection of the catalyst system in the practice of our process is critical. For example, we have found that a combination of N-ethylmorpholine and dibutyl tin dilaurate is unsatisfactory because it causes shrinkage of the cured product.

In view of the above, we began to look for a catalyst which would not cause shrinkage, would provide a satisfactory rise time, and would provide a satisfactory demolding time. The rise time is the time necessary for the foam or microcellular elastomer to reach its maximum size. For the rise time to be satisfactory, it must be sufficiently slow so that there is time for the foam or microcellular elastomer to wet-out the mold and form a skin without rotating the mold. If the rise time is too fast, the resulting product above the original pour line will have an undesirable pocked surface.

Finding a catalyst which provided no shrinkage and a slower rise time proved to be a difficult undertaking since catalysts providing slower rise times also resulted in unsatisfactorily long demolding times. The demolding time is the time necessary for the foam or microcellular elastomer to become sufficiently cured that it will not slump when demolded and is left unsupported. For example, a tertiary amine in combination with a delayed action metal catalyst such as an organomercury compound provided unduly long demolding times.

Unexpectedly we found that a combination of a tetraalkylguanidine or an isocyanate adduct thereof and an organomercury compound gave us a desirable rise time and demolding time.

The tertaalkylguandines useful as co-catalysts in our process are compositions of the formula:

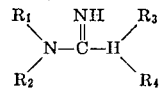

where $R_1$, $R_2$, $R_3$, and $R_4$ are the same or different and are phenyl groups or alkyl groups having between 1 and 6 carbon atoms inclusive. The alkyl groups can be methyl, ethyl, propyl, butyl, pentyl, or hexyl and where the alkyl group contains three or more carbon atoms may be straight or branched chain. We prefer to use tetramethylguanidine inasmuch as it is the cheapest tetraalkylguanidine of the above formula available.

The isocyanate adducts of the above mentioned tetraalkylguanidines may be formed by reacting the tetraalkylguanidine with an isocyanate. Suitable isocyanates include both aliphatic and aromatic isocyanates.

Representative aliphatic isocyanates include 1,4-tetramethylene diisocyanate and 1,6-hexamethylene diisocyanate. Examples of suitable aromatic isocyanates are toluene diisocyanate; diphenyl methane diisocyanate; phenylisocyanate, and chlorophenylisocyanate.

Organomercury compounds useful as co-catalysts for example are phenyl and cresyl mercuric salts of aliphatic acids having between 2 and 12 carbon atoms. Where the aliphatic acid contains three or more carbon atoms, the carbon chain may be straight or branched. Satisfactory organomercury compounds are, by way of example, phenyl mercuric acetate, phenyl mercuric propionate, phenyl mercuric butyrate, phenyl mercuric laurate, p-cresyl mercuric propionate, m-cresyl mercuric propionate, etc. We prefer to use phenyl mercuric propionate.

The tetraalkylguandine or isocyanate adduct thereof is present in an amount sufficient to provide a slow even rise. We prefer a rise time of about 40 to 70 seconds. For most purposes about 0.1 to 1 percent by weight of the tetrallkylguanidine based on the total weight of the reactants is sufficient or a corresponding equivalent of the isocyanate adduct thereof. The organomercury compound should be present in an amount sufficient to give a demolding time of about 10 minutes. Generally about 0.1 to 1 percent by weight based on the total weight of the reactants is satisfactory.

The foaming operation is effected by means of a blowing agent which vaporizes under the contacting conditions. Preferred blowing agents are fluorocarbons such as methylenedichloride, trichlorofluoromethane, and 1,2,2-trichloro-1,1,2-trifluoroethane.

Increasing the fluorocarbon blowing agent will decrease the density of the product up to a point. As is known in the art at some point the evaporation of the blowing agent consumes too much exothermic heat, causing insufficient blowing and improper cure. The density of the resultant product should be between about .5 and 60 pounds per cubic foot. When the density is at the lower end of the range, the product is a foam, and when the density is at the upper end of the range the product is a microcellular elastomer. Products in the intermediate range will be stiff foams. To produce a foam with a density of 10 pounds per cubic foot for example we have found that 10 percent by weight of trichlorofluoromethane is sufficient blowing agent. On the other hand, to produce a microcelluar elastomer with a density of 45 pounds per cubic foot for example, 1 to 2 percent by weight of methylene dichloride is sufficient.

Optional additives such as stabilizers, fillers, colorants, processing aids, surfactants, lubricants, plasticizers, etc., can be incorporated into the foams or microcellular elastomers prepared by our process if desired.

In practicing our process the ethylene oxide capped propylene oxide adduct, polytetramethylene ether glycol, diol, crosslinking triol or quadrol, quasi-prepolymer, catalyst system, and blowing agent are contacted simultaneously under substantially anhydrous conditions. By substantially anhydrous conditions we mean that no more than 0.1 percent by weight of water based on the weight of the total reactants be present. The contacting is at ambient temperature, usually around 26° C. The reaction mixture is dumped into a mold which is heated to a temperature between 30° C. and 55° C. After curing at ambient temperature for about 10 minutes, the product is removed from the mold and may be heat aged in some cases to improve its properties.

The contacting may be accomplished by rapid hand mixing or by mixing in a foaming machine. Any or all of the polyols, i.e., ethylene oxide capped propylene oxide adduct, polytetramethylene ether glycol, diol, and cross-linking triol or quadrol, may be premixed. The catalyst may also be premixed with any or all of the polyols. We prefer either of the following techniques: Ethylene oxide capped propylene oxide adduct, polytetramethylene ether glycol, diol, crosslinking triol or quadrol, catalyst system, and the blowing agent are mixed and pumped into a mixing head. The toluene diisocyanate quasi-prepolymer is also pumped into the mixing head in a separate stream and is thoroughly mixed with the first stream by a stirrer present in the head.

Alternatively, the blowing agent and organomercury compound may be mixed in a part of the ethylene oxide capped propylene oxide adduct and introduced into the mixing head in a third stream.

In either case, from the mixing head, the material is deposited into a heated mold which is moved relative in the mixing head in order to provide a layer of reactants on the bottom thereof. Thus, it is apparent that the process of our invention can be used with any of the usual mixing procedures of making foams or microcellular elastomers without requiring expensive and undesirable alterations.

The products of the process of the present invention are useful as foams or microcellular elastomers depending on the density. These products have an integral skin which is virtually pore free. As used herein "pore free" means that the skin has substantially no pores which are visible under six powers of magnification. The presence of a substantial number of pores having a size substantially greater than that set forth above is most undesirable for many applications. For example, the presence of a substantial number of pores greater than those visible under six powers of magnification presents an extremely difficult finishing problem.

The present invention is useful in the production of numerous foams of the type comprising a cellular core covered with a non-cellular skin, such as for example, seat cushions, automobile armrests, sun visors, life preservers, and a wide range of toys, and also in the production of numerous microcellular elastomers, such as for example, for automobile bumpers, gaskets, vibration isolators, shoe soles, and dock pads.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in the subjoined claims.

Throughout the following examples parts are expressed in parts by weight based on the weight of the total reactants unless otherwise indicated. Room temperature is to be taken to mean 26° C.

The cured products produced by the process of our invention had an integral skin of approximately 80 mil thickness which was uniformly formed around the foam and which had no substantial number of pores which were visible under 6 powders of magnification. Where indicated 12" x 12" x 1" test specimens were made and physical properties determined by the following tests:

Tensile strength at break point (ASTM D–1564)
Elongation at break point (ASTM D–1564)
Tear split (ASTM D–1564)
Compression set (ASTM–1654, Method B).

Test 1
EXAMPLE 1

100 parts of "Voranol CP 4701," 13 parts of polytetramethylene ether glycol having an average molecular weight of 650, 1.99 parts of triethanolamine, 7.05 parts of ethylene glycol, 0.5 part of tetramethylguandine, 0.5 part of phenyl mercuric propionate, and 17 parts of trichlorofluoromethane were mixed together at room temperature. To this mixture was added 50 parts of "Niax Isocyanate SF–50" sold by Union Carbide Corporation, New York, N.Y. (a quasi-prepolymer of a triol and toluene diisocyanate and having an NCO content of 32%). The isocyanate containing mixture was machine mixed and poured into a mold which had been preheated to 30° C. After 10 minutes the foamed product was demolded and post cured for 16 hours at 70° C. and then 3 days at room temperature.

The cured product had the following physical properties:

| | |
|---|---:|
| $M_c$[1] | 2420 |
| Density, lbs./ft.$^3$ | 12.4 |
| Tear split, p.l.i. | 3.6 |
| Compression set, percent | 18 |
| Foam tensile at break, p.s.i. | 21 |
| Foam elongation at break, percent | 125 |
| Skin tensile at break, p.s.i. | 380 |
| Skin elongation at break, percent | 130 |

[1] $M_c$ = the average molecular weight between crosslinks which is calculated by dividing the number of moles of crosslinkers by the weight of the total reactants.

Test 2

Another foam with an integral skin was prepared as in Test 1 except that 13 more parts of "Vornol CP 4701" was used in place of the polytetramethylene ether glycol. The cured product had the following properties:

| | |
|---|---:|
| $M_c$ | 2340 |
| Density, lbs./ft.$^3$ | 12.9 |
| Tear split, p.l.i. | 2.6 |
| Compression set, percent | 6 |
| Foam tensile at break, p.s.i. | 20 |
| Foam elongation at break, percent | 110 |
| Skin tensile at break, p.s.i. | 380 |
| Skin elongation at break, percent | 100 |

Test 3

The third foam in this series of tests was prepared as in Test 1 except that 15.8 parts of polypropylene ether glycol having an average molecular weight of 750 was substituted for the polytetramethylene ether glycol of similar molecular weight. The cured product had the following properties:

| | |
|---|---:|
| $M_c$ | 2450 |
| Density, lbs./ft.$^3$ | 13 |
| Tear split, p.l.i. | 3.0 |
| Compression set, percent | 7 |
| Foam tensile at break, p.s.i. | 21 |
| Foam elongation at break, percent | 130 |
| Skin tensile at break, p.s.i. | 300 |
| Skin elongation at break, percent | 105 |

Test 1 is in accordance with our invention while Tests 2 and 3 are not embodiments of our invention but were prepared to demonstrate the benefit of including polytetramethylene ether glycol in the foam formulation which is demonstrated by a comparison of the composite tear strength of the foam of Test 1 to the foams of Tests 2 and 3. Part of the beneficial benefit of using polytetramethylene ether glycol may in part be due to the reduction of crosslinking. To more clearly demonstrate the benefit of polytetramethylene ether glycol the tear strength of the foams of Tests 1 and 3 should be compared. Rather than substitute "Voranol CP 4701" for polytetramethylene ether glycol as in Test 2, a polypropylene ether glycol of similar molecular weight to the polytetramethylene ether glycol was used. Since the "Voranol CP 4701" was essentially a polypropylene oxide derivative, the use of polypropylene ether glycol brought out the benefit of the tetramethylene glycol backbone and the primary hydroxyl by keeping the amount of crosslinking of each formulation similar. Clearly the benefit of having polytetramethylene ether glycol in the formulation has been established.

EXAMPLE 2

The purpose of this example is to show the limitations on the amount of crosslinking compounds in the formulation used in our process.

Tests 4–8 inclusive

Foams having the formulation and properties described in Table I were prepared by the procedure of Test 1.

TABLE I

| Test number | 4 | 5 | 6 | 7 | 8 |
|---|---|---|---|---|---|
| "CP 4701"[a] | 100 | 100 | 100 | 100 | 100 |
| P-650[b] | 13 | 13 | 13 | 13 | 13 |
| TEA[c] | 4.4 | 2.98 | 1.99 | 1.99 | 1.74 |
| EG[d] | 5.5 | 6.43 | 7.05 | 7.05 | 7.2 |
| TMG[e] | 0.5 | 0.5 | 0.5 | 0.5 | 1.0 |
| HgCat.[f] | 0.5 | 0.5 | 0.5 | 0.5 | 0.5 |
| CCl$_3$F[g] | 17 | 17 | 17 | 17 | 17 |
| "SF-50"[h] | 52 | 52 | 52 | 50 | 50 |
| $M_c$ | 1,750 | 2,080 | 2,280 | 2,420 | 2,500 |
| Mold temp. °C.[i] | 30 | 30 | 30 | 30 | 30 |
| Density (lb./ft.$^3$) | 11.0 | 10.7 | 11.0 | 11.3 | 11.7 |
| Tear split (p.l.i.) | 2.4 | 2.4 | 2.9 | 3.4 | 3.4 |
| Comp. set (percent) | 10 | 8 | 10 | 18 | 22 |

Throughout this and following examples—
[a] "CP 4701" = "Voranol CP 4701."
[b] P-650 = Polytetramethylene ether glycol having an average molecular weight of 650.
[c] TEA = Triethanolamine.
[d] EG = Ethylene glycol
[e] TMG = Tetramethylguanidine.
[f] HgCat. = 20% solution of phenyl mercuric propionate in dipropylene glycol.
[g] CCl$_3$F = Trichlorofluoromethane.
[h] "SF-50" = "Niax Isocyanate SF-50," quasi-prepolymer of glycerol and toluene diisocyanate having an NCO content of 32%.
[i] Mold temp. = The temperature to which the mold was preheated.

Tests 4–8 inclusive are all embodiments of our invention and demonstrate the compromise between tear strength and compression set as the TEA and "SF-50" are reduced. Test 4 had an isocyanate index of 1.10 and an $M_c$ of 1750. As is evident from Table I, a very noticeable change in properties occurred by dropping the isocyanate index to 1.05 and raising the $M_c$ to 2500.

EXAMPLE 3

One of the purposes of this example is to demonstrate the relationship of the amount of "Voranol CP 4701" on the tear strength and compresison set.

Tests 9–12 inclusive

Foams having the formulation and properties described in Table II below were prepared by the method of Test 1.

TABLE II

| Test number | 9 | 10 | 11 | 12 |
|---|---|---|---|---|
| "CP 4701" | 100 | 90 | 80 | 70 |
| P-650 | 13 | 13 | 13 | 13 |
| TEA | 1.99 | 1.99 | 1.99 | 1.99 |
| EG | 7.05 | 7.2 | 7.4 | 7.6 |
| TMG | 0.5 | 0.5 | 0.5 | 0.5 |
| HgCat | 0.5 | 0.5 | 0.5 | 0.5 |
| CCl$_3$F | 17 | 17 | 17 | 17 |
| "SF-50" | 50 | 50 | 50 | 50 |
| $M_c$ | 2,420 | 2,350 | 2,270 | 2,190 |
| Mold temp., °C | 30 | 30 | 30 | 30 |
| Density (lbs./ft.$^3$) | 10 | 10.8 | 11.3 | 11 |
| Tear split (p.l.i.) | 3.2 | 3.1 | 4.25 | 5.2 |
| Comp. set (percent) | 10 | 22 | 19 | 21 |

All of the tests in this example are embodiments of our invention and show that as the amount of "CP 4701" was reduced the tear began to approach 5 p.l.i. and the compression set remained near 20%. Industrial requirements for integral skin polyurethane foams were set by one major automobile manufacturer in 1967 at a tear strength (split) of 5 p.l.i. and a compression set of 30%. Clearly most of the foams in this example meet the above industrial requirements.

The lower limits on the amount of TEA and "CP 4701" has been defined by us based on foam texture and processibility at 1.99 and 80 parts, respectively. If the TEA was lowered below 1.99 parts, the cell structure became poor. If the "CP 4701" was lowered much below 80, the foam became stiff. Another general trend indicated by Table II is that as the density increases so does the tear strength.

EXAMPLE 4

The purpose of this example is to show that the diol may be a member selected from the group consisting of ethylene glycol, 1,4-butanediol, and diethylene glycol.

Tests 13–21 inclusive

Foams having the formulation and properties described in Tables III and IV were prepared by the procedure of Test 1 except that part or all P-650, TEA, and EG was substituted for 1,4-BD (1,4-butanediol) or DEG (diethylene glycol).

TABLE III

| Test number | 13 | 14 | 15 | 16 | 17 | 18 |
|---|---|---|---|---|---|---|
| "CP 4701" | 100 | 100 | 100 | 100 | 100 | 100 |
| P-650 | 13 | 13 | 13 | 13 | 13 | 13 |
| TEA | 4.4 | 4.4 | 4.4 | 1.99 | 1.99 | 1.99 |
| EG | 5.5 | | | 7.05 | | |
| 1,4-BD | | 8 | | | 10.2 | |
| DEG | | | 9.4 | | | 12 |
| TMG | 0.5 | 0.5 | 0.5 | 0.5 | 0.5 | 0.5 |
| HgCat | 0.5 | 0.5 | 0.5 | 0.5 | 0.5 | 0.5 |
| CCl$_3$F | 17 | 17 | 17 | 17 | 17 | 17 |
| "SF-50" | 52 | 50 | 50 | 50 | 50 | 50 |
| Mold temp. (°C.) | 30 | 30 | 30 | 30 | 30 | 30 |
| Density (lbs. ft.$^3$) | 11 | 10.7 | 10.7 | 11.3 | 14 | 14.8 |
| Tear split (p.l.i.) | 2.4 | 2.0 | 1.55 | 3.4 | 3.6 | 2.3 |
| Comp. set (percent) | 10 | 5 | 7 | 18 | 3 | 9 |

TABLE IV

| Test number | 19 | 20 | 21 |
|---|---|---|---|
| "CP 4701" | 80 | 80 | 90 |
| P-650 | 13 | 13 | 13 |
| TEA | 1.99 | 1.99 | 1.99 |
| EG | 7.4 | | 7.2 |
| 1,4-BD | | | |
| DEG | | 12.7 | |
| TMG | 0.5 | 0.5 | 0.5 |
| HgCat | 0.5 | 0.5 | 0.5 |
| CCl$_3$F | 17 | 17 | 17 |
| "SF-50" | 50 | 50 | 50 |
| Mold temp. (°C.) | 30 | 30 | 30 |
| Density (lbs./ft.$^3$) | 11.3 | 11.5 | 12.4 |
| Tear split (p.l.i.) | 4.25 | 3.2 | 4.2 |
| Comp. set (percent) | 19 | 14.1 | 20.0 |

Tables III and IV give a good indication how each of the substitute extenders effect the system. 1,4-butanediol is a good replacement for ethylene glycol when better compression set is needed, but ethylene glycol is much cheaper. Diethylene glycol gives better compression set also, but the tear strength is poorer. On the basis of price and properties imparted to the foam, ethylene glycol was the best all around diol. All of the tests in this example are embodiments of our invention.

EXAMPLE 5

Test 22

A microcellular elastomer was prepared by the method of Test 1 except that 2 parts dichloromethane was substituted for the trichlorofluoromethane. The resultant product had a density of about 40–45 lbs./ft.$^3$ and a well formed integral skin which was substantially pore-free.

From the foregoing description we consider it to be clear that the present invention contributes a substantial benefit to the polyurethane art.

We claim:
1. A molding method for preparing polyurethane foams and microcellular elastomers with integral skins which comprises the sequential steps of
(a) contacting under substantially anhydrous conditions
(1) an ethylene oxide capped propylene oxide adduct of a first triol, said ethylene oxide capped propylene oxide adduct having 40 to 75 percent primary hydroxyl and an average molecular weight of about 2000 to about 7000;
(2) polytetramethylene ether glycol having an average molecular weight of 500 to 1000;
(3) a diol;
(4) a second triol or a quadrol simultaneously with a quasi-prepolymer of toluene diisocyanate and a third triol; in the presence of a catalyst system consisting of a tetraalkylguanidine or an isocyanate adduct thereof and an organomercury compound selected from the group phenyl and cresyl salts of aliphatic acids having between 2 and 12 carbon atoms; and in the presence of a blowing agent which vaporizes under the contacting conditions;
(b) pouring the contacted mixture into a mold which is preheated to a temperature between about 30° C. and 55° C.;
(c) permitting the contents of the mold to cure in contact with the mold; and
(d) removing the resulting self-supporting polyurethane product from the mold.

2. The method of claim 1 wherein the first triol and the third triol are independently selected from the group consisting of trimethylol propane; glycerol; 1,2,4-butanetriol; and 1,2,6-hexanetriol; and the second triol is selected from the group consisting of trimethylol propane; glycerol; 1,2,4-butanetriol, 1,2,6-hexanetriol; and triethanolamine; the diol is selected from the group consisting of ethylene glycol, diethylene glycol; and 1,4-butanediol; the tetraalkylguanidine is tetramethylguanidine; and the organomercury compound is phenyl mercuric propionate.

3. The method of claim 1 wherein the diol is selected from the group consisting of ethylene glycol, diethylene glycol, and 1,4-butanediol; the second triol is triethanolamine; the tetraalkylguanidine is tetramethylguanidine; and the organomercury compound is phenyl mercuric propionate.

4. The method of claim 1 wherein the catalyst system consists of 0.1 to 1 percent by weight of the tetraalkylguanidine or a corresponding equivalent of the isocyanate adduct thereof and 0.1 to 1 percent by weight of the organomercury compound, based on the weight of the total reactants.

5. The method of claim 1 wherein the catalyst system consists of 0.1 to 1 percent by weight of the tetraalkylguanidine, tetramethylguanidine, and 0.1 to 1 percent by weight of the organomercury compound, phenyl mercuric propionate.

6. The method of claim 1 wherein the diol, polytetramethylene ether glycol, second triol or quadrol, and the ethylene oxide capped propylene oxide adduct of the first triol are in an equivalent ratio about 2:1:1:1 to 5:1:1:1.

References Cited
UNITED STATES PATENTS 3,238,154  3/1966  Mosso _____ 260—77.5 AC
3,642,044  2/1972  Fertig et al. _____ 260—77.5 AC

OTHER REFERENCES

Wirtz: J. Cellular Plastics, September/October 1969, pp. 304–309.

MAURICE J. WELSH, JR., Primary Examiner

U.S. Cl. X.R.

260—2.5 AP, 2.5 AC, 77.5 AP, 77.5 AC